Sept. 27, 1960     E. J. STORDAL     2,954,061

DRIVE WHEEL FOR BAND SAWS

Filed July 14, 1958

RUBBER TREAD BONDED TO METAL HOOP

TAPER EXAGGERATED

INVENTOR
Eigil J. Stordal

United States Patent Office 2,954,061
Patented Sept. 27, 1960

2,954,061

DRIVE WHEEL FOR BAND SAWS

Eigil J. Stordal, Minneapolis, Minn., assignor to Continental Machines, Inc., Savage, Minn., a corporation of Minnesota Filed July 14, 1958, Ser. No. 748,209

4 Claims. (Cl. 143—30)

This invention relates generally to machine tools of the class that includes band saws, band filing machines, cut off saws and the like; and the invention relates more particularly to band wheels or pulleys around which the endless bands of such machines are trained.

Band saws and similar machines of the type with which this invention is concerned are provided with a saw head assembly including an endless saw band trained about a plurality of pulleys or wheels mounted for rotation on spaced parallel axes. One of the wheels about which the band is trained is power driven and drives the band by frictional engagement between the periphery of the wheel and one face of the band.

It has heretofore been conventional in band saws and similar machine tools to provide the band wheels or pulleys with rubber treads on their circumferential blade engaging surfaces which tread was slightly rounded or crowned across its width, causing the blade to tend, at all times, to seek the high point of the tread and thus remain centered between the faces of the band wheel. Rubber treads were used on such band wheels not only to afford good tractive frictional engagement between the band wheel and the band, but also to permit the teeth on the saw band to sink slightly into the wheel periphery as the band traversed the wheel, thus preventing damage to the teeth on the band.

However, in machines such as high speed cut off saws, where the cutting stretch of the saw band must be bathed in lubricant or cooling fluid, it was found impracticable to use such rubber treaded wheels because the film of lubricant clinging to the band caused marked slippage between it and the tread surface on the drive wheel, and permitted the band to wobble across the wheel periphery and sometimes come entirely off of the wheel. In the copending application of Robert L. Crane, Serial No. 643,600, filed March 4, 1957, issued December 23, 1958 as Patent No. 2,865,412, there is disclosed a drive wheel for cut off saws and the like wherein such slippage is overcome by the provision of an all metal drive wheel having narrow lands or ridges extending circumferentially around its blade engaging surface. The periphery of the wheel disclosed in said application was also provided with a slight taper, and the band that was trained around the wheel therefore had a tendency to climb toward one face of the wheel rather than climbing to a medial position on top of a rounded crown, as had previously been the practice. To define the limit of such axial climbing motion of the band, the wheel was provided with a so-called back-up flange extending circumferentially around its periphery at the face thereof toward which the blade tended to climb, and by which the rear edge of the blade was engaged so as to hold the blade in a fixed axial position relative to the wheel.

However, with such all metal drive wheels it was necessary to insure that the teeth on the saw band would not be brought into engagement with the wheel periphery as the blade traversed the wheel, because the band was held around the wheel under substantial tension and its teeth would not only be dulled by their engagement with the hard surface of the wheel, but they would also be bent out of their proper set; and of course the wheel would likewise be damaged by the saw teeth. Hence the drive wheel shown in said application could only be used with blades having a width greater than the width of the blade engaging peripheral surface on the drive wheel.

To some extent this limitation was overcome in the drive wheel disclosed in the copending application of Robert J. Wilkie, Serial No. 678,944, filed August 19, 1957, issued March 31, 1959 as Patent No. 2,879,813. That drive wheel employed the hard grooved and tapered blade engaging peripheral surface of the drive wheel of the aforesaid Robert L. Crane patent, but its back-up flange was axially adjustable to vary the width of its blade engaging circumferential surface and thus assure that the teeth of the saw band would not contact the wheel as the band moved thereover, regardless of the width of the blade being used. Although this drive wheel could accommodate blades of a wide range of widths, it had the serious disadvantage that it required adjustment each time a blade of a different width was installed on the machine, and this meant the the operator had to take time to perform an additional operation almost every time the saw blade was changed.

By contrast with these prior expedients, it is an object of the present invention to provide a band wheel for band saws and similar machine tools, capable of use with bands of any width and requiring no adjustment to accommodate it to bands of various widths, and which, moreover, may be used not only on band type machine tools having a dry blade but also on those wherein the blade or band is subjected to a flow of cutting fluid or lubricant as it traverses the cutting zone.

An important feature of this invention resides in the discovery that a band wheel for a band type of machine tool may be provided with a resilient peripheral tractive surface by which the band is engaged, and that such a band wheel can be operated satisfactorily even though the blade is at all times covered with a substantial film of lubricant or cooling fluid, provided that the resilient blade engaging surface has the proper contour across its width, and provided further that the wheel is equipped with a circumferential back-up flange at one face thereof.

Thus it is another object of this invention to provide a versatile band wheel for band saws and the like having a peripheral blade engaging surface which is provided by a layer of rubber or similar resilient material, and which band wheel is not only adapted for use with blades of different widths, without necessity for any adjustment, but can also be used very satisfactorily on machines that require cooling fluid or lubricant to be applied to the band at all times during the cutting operation.

Another object of this invention resides in the provision of a band wheel or pulley for a band saw or the like having a rubber tread on its blade engaging peripheral surface, which tread may be readily removed from and installed upon the wheel so that it can be easily and quickly replaced when it becomes worn through long use.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which.

Figure 1:
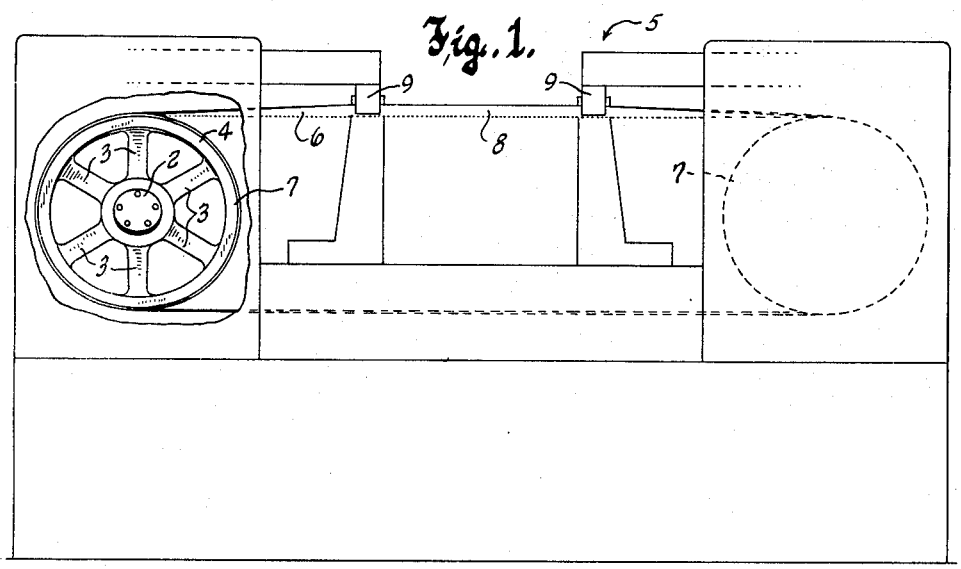
Figure 1 is a more or less diagrammatic end view of a cut off saw having a band wheel embodying the principles of this invention.
Figure 2:
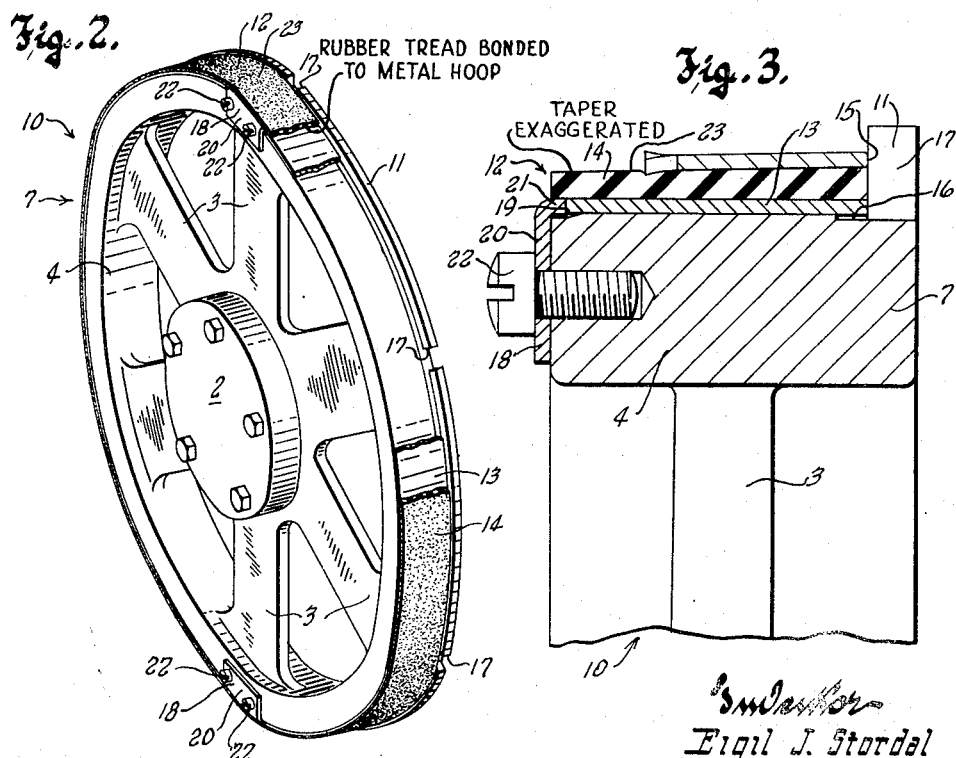
Figure 2 is a perspective view of the band wheel of this invention with portions broken away.

Referring now to the accompanying drawing, the numeral 5 designates generally a machine tool of the type which comprises an endless band or blade 6 trained around a plurality of band wheels 7, with one straight stretch 8 of the band extending through a cutting zone at which it is adapted to be engaged with a piece of work to be cut or filed. In this case the machine tool illustrated is a cut off saw, in which the cutting stretch of the saw band extends horizontally and the drive wheels rotate on substantially horizontal parallel axes. As the band enters and leaves the cutting zone, it passes through guides 9 by which it is held twisted so that its teeth face downwardly in the cutting zone. It will be understood, of course, that the band wheel of this invention is also useful on conventional band saw machines, where the cutting stretch of the band extends vertically through a table.

In general, the band wheel of this invention comprises a wheel 10 having a hub 2, spokes 3 providing a web portion, and a felly portion 4 with a circumferentially extending flange 11 adjacent to one face thereof. Closely fitted around the felly portion of the wheel is a removable rim member 12 which comprises a metal hoop 13 having a tread 14 of rubber or the like bonded to its outer surface.

Figure 3:
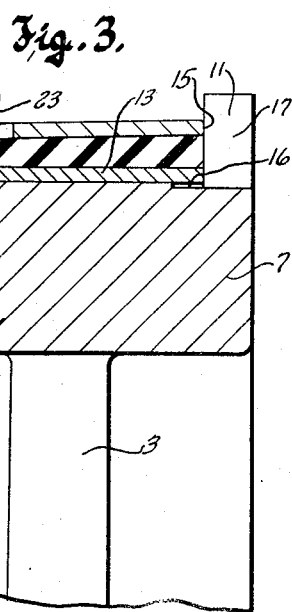
Figure 3 is a fragmentary cross-sectional view through the felly portion of the band wheel of this invention, taken on a plane lying on the axis of the wheel.

The flange 11 is preferably integral with the wheel and extends radially beyond the surface of the rubber tread on the rim, to have its inner face engaged by the rear edge 15 of the saw band, as may be seen in Figure 3. Directly adjacent to the flange, the wheel periphery has a circumferential groove 16 therein, and the flange is broken by a plurality of slots 17, the bottoms of which are flush with the bottom of the groove 16. These slots facilitate removal of the rim from the wheel.

The metal hoop 13 which comprises the rigid foundation of the rim fits closely around the periphery of the wheel and is secured against both axial and rotational displacement with respect to the wheel by means of clips 18. The hoop has a pair of diametrically opposite shallow slots 19 opening to the edge thereof remote from the flange. Each of the clips is bent to a substantially L-shape and has its stem portion 20 overlying that face of the felly portion of the wheel which is remote from the flange, and the foot portion 21 of the clip projects into one of the slots 19 in the hoop. Screws 22 threaded into the felly portion of the wheel through the stem portion of each clip removably hold the clips in place, and the clips, in turn, confine the hoop against the flange 11, and, by their engagement in the slots 19, constrain the hoop to rotate with the wheel.

The rubber tread is bonded to the hoop, and it is an important feature of this invention that the peripheral surface 23 of the tread tapers convergingly away from the flange 11, so that a band or blade trained over the wheel will at all times have a tendency to "climb" the tread toward the flanged face of the wheel. The rear edge of the blade, however, will of course engage the flange, so that the blade will at all times maintain a fixed axial location with respect to the drive wheel. Because of the resilience of the rubber tread, a blade of any width can be accommodated by the band wheel, since the teeth of the blade can readily sink into the surface of the tread without injury to the blade or the band wheel. Another noteworthy advantage of this arrangement, which will be obvious to those skilled in the art, is that the rear edge of the saw band, regardless of the width of the blade, will always engage a fixed rear guide block at the guide post, with no need to change or adjust the back-up member at the cutting zone when blades of different widths are installed.

It has been found that a band wheel embodying the principles of this invention, unlike previous band wheels having rubber treads, and contrary to what might be expected, works very well with blades and bands that are coated with lubricant or cooling fluid, and has no tendency to slip or to wobble across the wheel. Needless to say, the band wheel of this invention is also highly satisfactory for use with dry blades, and it therefore has great versatility.

From the foregoing description taken together with the accompanying drawing it will be apparent that this invention provides a band wheel for band saws and similar band-type machine tools, which wheel has a rubber or similar resilient tread surface on its periphery, so that it provides good driving traction and can accommodate blades of any width without need for adjustment, and that the band wheel of this invention, moreover, can be employed equally well with either wet or dry blades.

What is claimed as my invention is:

1. In a machine tool of the band saw type wherein an endless saw band is trained around the circumferential faces of band wheels and which has means for applying liquid lubricating coolant to the saw band in a cutting zone between the band wheels, a band wheel capable of being used with saw bands of a wide range of widths without slippage, despite the presence of liquid lubricating coolant on the saw band, said band wheel being characterized by: a layer of resilient rubber-like material around the circumferential face of the band wheel; by a substantially rigid flange extending circumferentially around the wheel at one axial face thereof and projecting radially beyond the surface of said resilient layer, against which flange the back edge of a saw band trained around the wheel is adapted to engage; and further characterized by the fact that the surface of said resilient layer has a small taper, converging away from said flange, whereby a saw band trained around the wheel is urged axially toward the flange to maintain its back edge in engagement therewith.

2. In a machine tool of the band saw type wherein an endless saw band is trained around the circumferential faces of band wheels and which has means for applying liquid lubricating coolant to the saw band in a cutting zone between the band wheels, a band wheel capable of being used with saw bands of a wide range of widths without slippage, despite the presence of liquid lubricating coolant on the saw band, said band wheel being characterized by: means on the periphery of said wheel providing a yieldingly resilient rubber-like surface around which a saw band may be trained and into which the teeth of the band may sink without being deformed; further characterized by the fact that said peripheral surface of the wheel has a substantial uniform small axial taper from one face of the wheel to the other, so that a saw band trained over the wheel tends to shift axially toward said one face thereof to have good tractive engagement with said peripheral surface of the wheel; and further characterized by means on the wheel defining a rigid circumferential flange at said one face thereof, projecting radially beyond said peripheral surface and against which the back edge of a saw band trained around the wheel is adapted to engage to be held thereby against shifting axially off of the wheel.

3. The band wheel of claim 1, further characterized by: a hoop of rigid material having said layer of resilient rubber-like material secured on its outer periphery; means on the wheel defining a rigid felly portion having a substantially cylindrical surface around which said hoop closely fits; and means on the wheel cooperable with said hoop to detachably secure the same onto the wheel.

4. The band wheel of claim 3 wherein said hoop has notches in its axial face remote from said flange on the wheel; and wherein said means for securing the hoop onto the wheel comprises a plurality of clips, each secured to the wheel and engaged in one of said notches in the hoop to preclude rotation of the hoop relative to the wheel and to confine the hoop axially against said flange on the wheel.

References Cited in the file of this patent

UNITED STATES PATENTS

| | | |
|---|---|---|
| 1,269,879 | Tennent | June 18, 1918 |
| 1,593,751 | Carter | July 27, 1926 |
| 2,081,033 | Biro | May 18, 1937 |
| 2,233,562 | Tannewitz | Mar. 4, 1941 |
| 2,328,869 | Wilkie | Sept. 7, 1943 |
| 2,815,562 | Wilkie et al. | Dec. 10, 1957 |
| 2,865,412 | Crane | Dec. 23, 1958 |
| 2,879,813 | Wilkie | Mar. 31, 1959 |

FOREIGN PATENTS

| | | |
|---|---|---|
| 19,027 | Denmark | July 13, 1914 |
| 888,396 | France | Sept. 6, 1943 |